United States Statutory Invention Registration [19]

[11] Reg. Number: H799

Farthing et al. [43] Published: Jul. 3, 1990

[54] HIGH CONCENTRATION STANDARD AEROSOL GENERATOR

[75] Inventors: William E. Farthing, Birmingham, Ala.; Randal S. Martin, Pullman, Wash.; Kenneth M. Cushing, Birmingham, Ala.

[73] Assignee: The United States of America as represented by the Secretary of the Army, Washington, D.C.

[21] Appl. No.: 186,265

[22] Filed: Apr. 28, 1988

[51] Int. Cl.[5] ..... B01D 45/12

[52] U.S. Cl. ..... 55/392; 55/17; 55/462; 55/465; 252/305

*Primary Examiner*—John F. Terapane
*Assistant Examiner*—Joseph D. Anthony
*Attorney, Agent, or Firm*—Robert P. Gibson; Edward Goldberg; Edward S. Costigan

[57] ABSTRACT

An apparatus which produces an aerosol having a narrow size distribution. The apparatus includes a supply means for providing a primary aerosol stream having a wide size distribution. Concentration means are positioned to receive the stream and this concentration means includes means for reducing volume flow rate without disregarding a proportionate fraction of the particles to provide a reduced flow rate stream. Venturi means are provided to monitor the stream and transfer the stream. Impactor means are provided for receiving the stream and introducing a core of clean air into the center of the stream. Means are provided for adjusting the relative velocities of the stream and the core to exclude particles having an inertia below a predetermined size, thereby eliminating smaller particles. Outlet impactor means are positioned to receive the stream and the core, for removing particles larger than a predetermined size. Exit means are provided for delivering the primary aerosol stream having the narrow size distribution.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH CONCENTRATION STANDARD AEROSOL GENERATOR

FIELD OF THE INVENTION

The invention described herein may be manufactured, used, and licensed by or for the Government for Governmental purposes without the payment to us of any royalties thereon.

This invention relates to aerosol generators, and particularly to generators capable of producing a narrow size distribution or particles.

BACKGROUND OF THE INVENTION

For aerosol research and testing, it is important to have aerosols available with known and controllable properties. Particle size distribution is always an important parameter. Frequently, a narrow size distribution is needed. For many investigations, high concentration is the major consideration. Sometimes, this is coupled with the need for high flowrates. The major function of the High Concentration Standard Aerosol Generator hereinafter identified as (HCSAG) is the long term production of aerosols with the combination of high concentration and high flowrate (high rate of particulate mass per second) with a narrow size distribution greater than 1 micron.

Monodisperse aerosols are created by very strict control of the generation mechanism. In techniques using mechanical agitation such as the vibrating orifice or oscillating reed, a liquid jet is segmented at regular intervals to produce droplets of the same volume. For each jet velocity and diameter the frequency of agitation must be tuned very accurately to prevent the formation of multiple sizes. The generation rate is limited to the order of $10^5$ particles per second. To obtain a mono-disperse aerosol by condensation, the thermodynamic properties of the flowstream must be kept in a narrow range during cooling. This requirement is increasingly difficult to achieve as the desired particle size and flowrate becomes larger. Available generators of this type have low flowrates, and are practically limited to small sizes.

It would be of great advantage to use a polydisperse aerosol generator, followed by devices which separate the particles of the desired size from the larger and smaller sizes. A similar approach is used in a commercial system for submicron particles, where all particles are electrically charged to about the same level and then particles with smaller and larger sizes than desired are collected upon passing the aerosol through an applied electric field.

Further, a virtual impactor passes the aerosol through a small opening to form a jet which impinges upon a "virtual" surface through which a small (or "token") fraction of the jet passes. The token flow is in the direction coincident with the jet flow while the path of the bulk of the gas follows curved lines with a 90° or more change in direction. Through inertia the larger aerosol particles penetrate the virtual surface and are entrained with the token flow while the smaller particles stay entrained with the bulk flow of gas.

It has been suggested to pass an aerosol through 2 virtual impactors in series to obtain an aerosol with a narrow size distribution. However this virtual impactor is limited to small sample flow of 10 pm and is subject to build up of aerosol particles on walls of the flowstreams. thus, obstructing the flow, if alterations are not made to remove particles from the internal surfaces of the device.

Pre-existing devices for obtaining aerosols with a narrow size distribution through creating only one size are limited to small particulate rates because of the necessary strict control of the creation mechanism. Pre-existing devices which remove large and small particles from an initial polydisperse aerosol are limited by accumulation of particulate material on critical surfaces causing electrical discharge or obstruction of the flowstream.

Accordingly, it is an object of this invention to produce an aerosol with narrow size distribution which can be done at high rate of particulate mass. Another object is to provide apparatus for producing such an aerosol stream without excessive waste. Yet another object is to employ inertia forces, rather than electrical forces, to separate large and small particles from particles of a desired size.

SUMMARY OF THE INVENTION

It has now been discovered that the above and other objects of this invention may be accomplished in the following manner. Specifically, an apparatus can be produced which supplies an aerosol having a narrow size distribution. The apparatus includes supply means for providing a primary aerosol stream, recognizing that the primary stream will have particles of a wide size distribution. Concentration means are positioned to receive said stream and reduce the volume flow rate without discarding a proportionate fraction of particles. A reduced flow rate stream is produced and received by a venturimeans which is useful for monitoring the stream and transferring the streams.

Impactor means are provided to receive the stream from the venturi means. A core of clean air is introduced into the center of the stream. Means are provided for adjusting the relative velocities of the stream and the core inertia below a predetermined level or size.

The stream and core are fed to an outlet impactor means which removes particles larger than a predetermined size, so that a primary aerosol stream exists from the apparatus.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
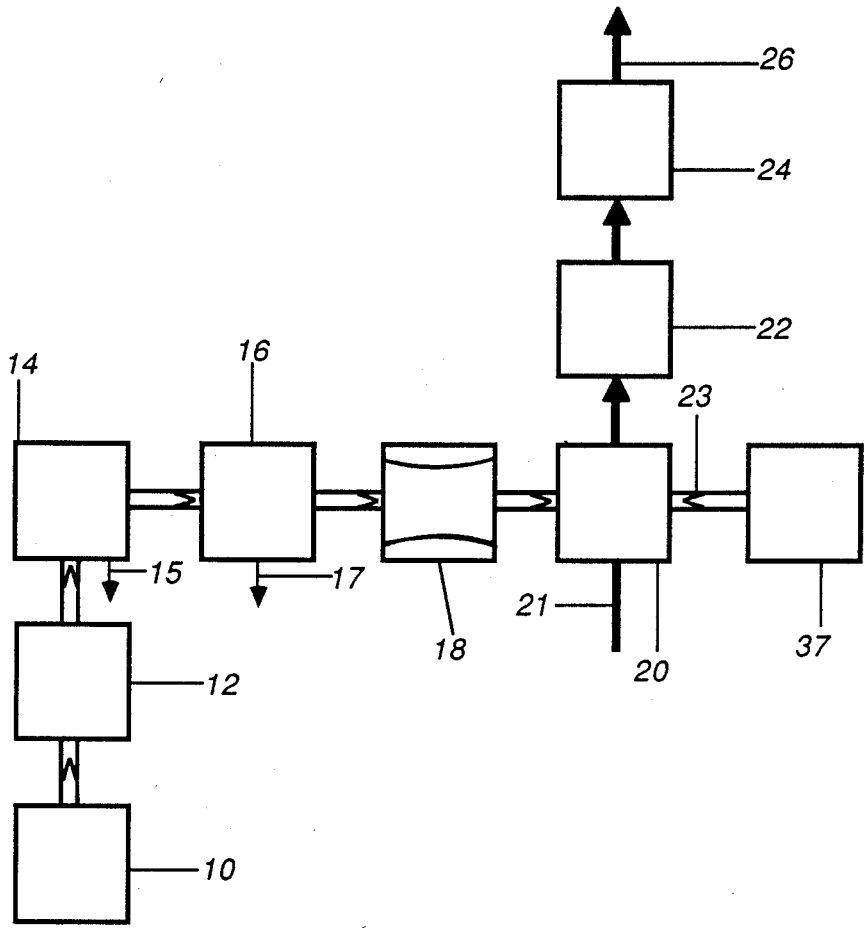
FIG. 1 is a schematic block diagram showing one embodiment of the present invention.

The aerosol generator of this invention is a unique combination of several components as illustrated in FIG. 1. Compressed air feeds about 425 slpm (liters per minute at standard conditions) 10 to a polydisperse aerosol generator (PAG) 12. Aerosol from the PAG passes through two virtual Impactors 14 and 16 to the primary device 20 for the removal of the small size fraction. The major purpose of impactors 14 and 16 is to concentrate the primary aerosol stream by reducing the volume flowrate to a level acceptable for the device 1 without discarding a proportionate fraction of the particles of interest. The flow split in both 14 and 16 is 10% so that 4 slpm exists through the token flow of impactor 16. A venturi 18 is utilized to accurately adjust and monitor the flow from 16.

20 is a virtual impactor in which a core of clean air, 21 is introduced at the center of the aerosol stream before entering the impactor jet. All of the token flow is comprised of air from this clean core. Only particles with inertia large enough to penetrate into this token flow are thus retained. Retention of small particles in the primary aerosol stream is far below that which can be achieved with traditional virtual impactors. Clean sheath air 23 is also utilized to produce a sharper retention (or collection) efficiency than would otherwise occur and wall losses are probably reduced also. Limits on the proportions of $Q_{CORE}$' $Q_{2T}$ and $Q_{SH}$ are identified as:

$$Q/Q_{2T} \geqq 1.43$$

and $$Q_{CORE}/Q_{2T} \geqq 0.8 \frac{Q}{Q_{2T}} - 1$$

where Q is the total flowrate. This virtual impactor 20 was tested in a test investigation at total flowrates from 5 to 30 lpm, using air supply means 37.

As shown in FIG. 1, upon exiting 20 the aerosol stream ($Q_{3T}$+3 lpm) enters the outlet impactor (OP) 22 for removal of the large particles. OP is a classical impactor except that sheath air is added prior to the jet to maintain the desired size cut and reduce wall losses. The primary aerosol stream exits the system through a pressure let-down orifice 24. This component is necessary because of the significant pressure head across the system which is necessary to establish the desired cutpoints around 1.5 μm.

Figure 2:
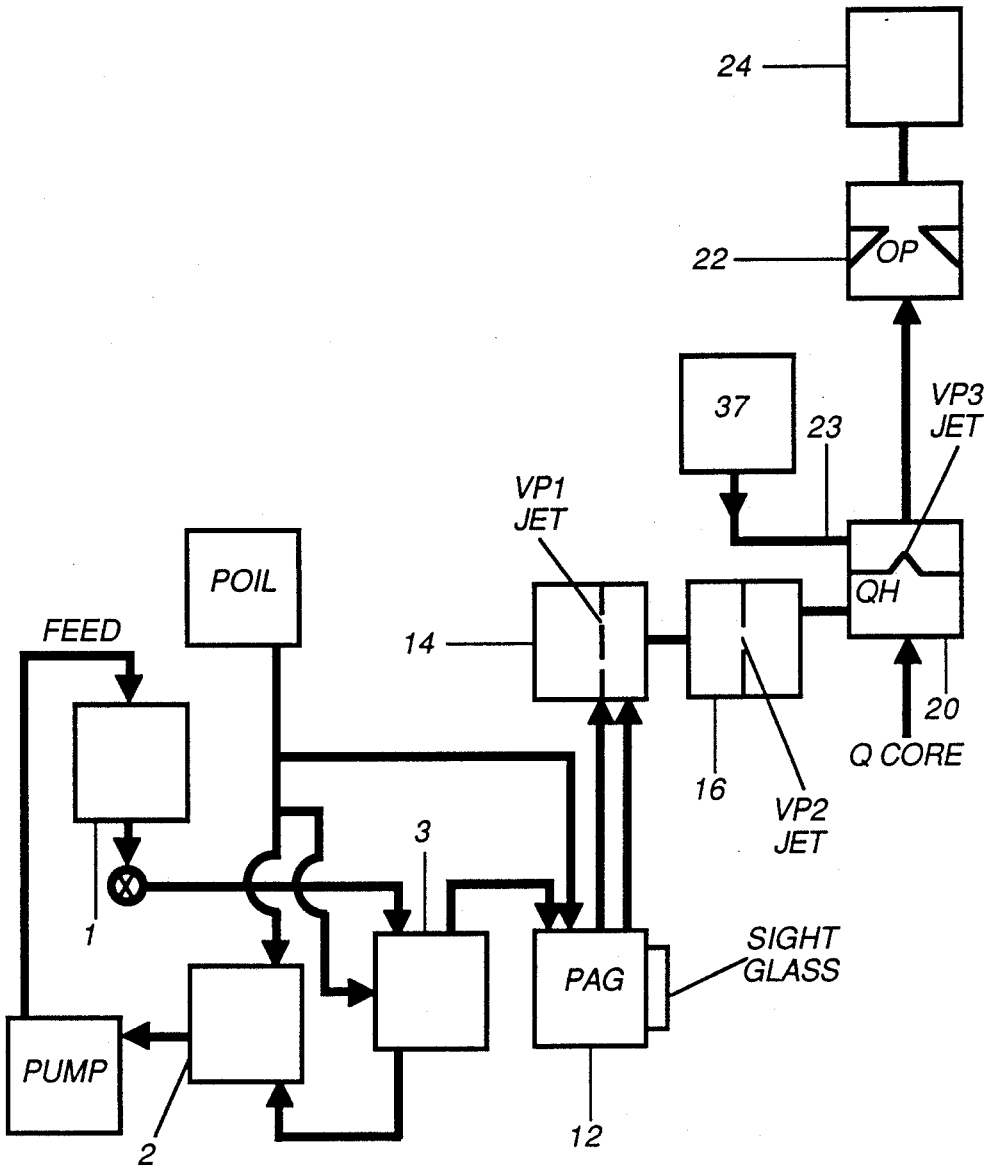
FIG. 2 is a more detailed schematic showing particular features of the embodiment shown in FIG. 1.

FIG. 2 gives a more detailed diagram of components of the system. The liquid supply subsystem shown at the lower left of FIG. 2 consists of 3 reservoirs (1, 2, and 3) in addition to the polydisperse aerosol generator (PAG) canister. The aerosol liquid (DuoSeal Vacuum Pump Oil at this time) is poured into the top (No. 1) reservoir at the fill tube. Opening the valve under reservoir No. 1 allows liquid to flow into reservoir No. 3 which feeds the PAG. Compressed air at pressure $P_{oil}$ is utilized to augment gravity in transferring liquid to the PAG. this pressure regulator is located at the bottom right of the front panel where it can be adjusted to keep the oil level constant as viewed through the site glass adjacent to it. Once that setting is established $\Delta P_{oil}$ (measured at the gauge adjacent to the site glass) is an accurate parameter for reproducing a desired fluid level. Overflow from reservoir No. 3 flows to reservoir No. 2 until the levels in reservoirs No. 2 and 3 equalize. Then reservoir No. 2 is emptied by pumping liquid back to reservoir No. 1 via the hand operated peristaltic pump.

Aerosol leaves the PAG through two 1 inch tubes 30 to the entrance chamber of VP1, above the PAG. These 1 inch tubes reach to within ¾" of the top wall of this chamber, thus impacting large drops which may be lofted in the PAG. liquid thus impacted drains to a catch bottle. Note that the unit composed of VP1 and VP2 has a slight tilt to assure proper drainage to the catch bottles.

The pressure P at the VP1 inlet and the pressure drop across the jets of VP1, ΔP, are monitored on the front panel. The flowrate through the 8 jets of VP1 is given by $$Q_1 = 29.1\sqrt{\Delta P_1 T/(P_1 + P_{BAR})}$$

for $Q_1$ in alpm (liters per minute at actual conditions), $\Delta P_1$ in PSI, T (temperature) in °R, $P_1$ in PSIG, and $P_{BAR}$ in PSIA. Most of this flow is exhausted through 6 lines symmetrically placed around the exterior wall of VP1. The lines enter a "ring" shaped polyvinyl chloride (PVC) plenum which exhausts through a 1½ inch tygon tube to a high efficiency coalescing filter.

The token flow of VP1, carrying the primary aerosol, passes to the inlet chamber of VP2. The flowrate through the single jet of VP2 is given by $$Q_2 = 3.2\sqrt{\Delta P_2 T/(P_2 + P_{BAR})}$$

where units are the same as in Equation (1). $P_2$ and $\Delta P_2$ are monitored on the front panel. Most of this flow is exhausted through a coalescing filter and rotameter in a manner similar to the exhaust of VP1. $Q_2$ is monitored by a rotameter located on the front panel. The token flow of VP2 passes to the Hochrainer impactor (VP3) through a venturi which provides an accurate determination of flowrate:

$$Q_{2T} = 0.83\sqrt{\Delta P_V/(P_3 + P_{BAR})}$$

for $Q_{2T}$ in alpm, $\Delta P_V$ (pressure drop across the venturi) in in PSIG and $P_{BAR}$ in PSIA. $\Delta P_V$ and $P_3$ are monitored by gauges on the front panel. The aerosol stream is merged with two other flows $Q_{CORE}$ and $Q_{SH}$ in the Hochrainer impactor, $Q_{CORE}$ and $Q_{SH}$ are monitored by rotameters on the front panel. The flowrate through the jet of VP3 is given by $$Q_3 = 0.61\sqrt{\Delta P_3 T/(P_3 + P_{BAR})}$$

for $Q_3$ in alpm (upstream conditions), $\Delta P_3$ inches of water, $P_3$ in PSIG, and $P_{BAR}$ in PSIA. Meters giving $\Delta P_3$ and $P_3$ are located on the front panel. The sample stream passes through a series of 0.8 mm holes to establish laminar flow. These holes can become covered with liquid due to wall losses. Cotton threads to serve as a wick are used to reduce the buildup of liquid. The wick extends into the drain bottle for this region. This wick was found necessary for long term (hours) of operation. Most of the flow of VP3 is exhausted through a coalescing filter, a metering valve, and a rotameter. The valve and rotameter are located on the front panel. This valve is important for adjusting the flow split between the exhausted air, $Q_{HD}$ and the token flow, $Q_{HT}$. The primary aerosol (without the small fraction) passes into the token flow of VP3. This flowrate $Q_{HT}$ is determined by the difference ($Q_3 - Q_{HD}$). The token flow of VP3 is merged with a sheath of clean air in the outlet impactor (OP) shown in schematically in FIG. 2. This sheath air flowrate $Q_1$ is monitored by a rotameter on the front panel. $Q_1$ is set at a value for which OP will remove the large size fraction. An air supply means 37 provides the sheath of air in the outlet impactor OP. In principle the exact value depends upon the trade-off between the desired width of the distribution versus the desired particle rate.

As shown in FIG. 2, a substantial part of the HCSAG hardware is designed to drain liquid collected on the walls away from the flowstreams. These losses are undesirable but unavoidable. This feature is necessary for continuous operation of the device.

Flowrates needed to obtain the desired output aerosol are obtained empirically. Adjustments of valves is needed to obtain the desired flows and once these adjustments are performed, operation of the system requires only that liquid be added to reservoir No. 1 and the main air supply valve be opened.

Tests of the devices described above demonstrated continuous operation providing a stable aerosol with geometric standard deviation of 1.3 MMD (mass median diameter) of 1.7 micron, and total concentration of 100 mg/m$^3$ 3.8 cfm. This combination of characteristics is unique and cannot be obtained with existing aerosol generators.

The embodiments of the invention in which an exclusive property or right is claimed are defined as follows:

We claim:

1. An apparatus for producing an aerosol having a narrow size distribution, comprising:

supply means for providing a primary aerosol stream having a wide size distribution;

concentration means positioned to receive said stream, including means for reducing the volume flow rate of said stream without discarding a proportional fraction of the particles to produce a reduced flow rate stream;

venturi means for receiving said reduced flow rate stream, including means to monitor said stream and transfer said stream;

impactor means for receiving said stream and introducing a core of clean air into the center of said stream, including means for adjusting the relative velocities of said stream and said core to exclude particles having an inertia below a predetermined size;

outlet impactor means positioned to receive said stream and core, for removing particles larger than a predetermined size; and exit means for exiting a primary aerosol stream.

2. The apparatus of claim 1 wherein said concentration means include a pair of vertical impactors connected to sequentially receive said stream and transfer said stream through a plurality of jets to a coalescing filter, to thereby produce said reduced flow rate stream.

3. The apparatus of claim 1 wherein said impactor means further includes air supply means for providing sheath air to said means to thereby produce sharper retention efficiency.

4. Apparatus of claim 1 wherein said outlet impactor further includes means for providing sheath air prior to adding the jet, to maintain the desired size cut and reduce wall losses.

* * * * *